(12) United States Patent
Yan et al.

(10) Patent No.: US 8,163,946 B2
(45) Date of Patent: Apr. 24, 2012

(54) METHODS AND CATALYSTS FOR MAKING BIODIESEL FROM THE TRANSESTERIFICATION AND ESTERIFICATION OF UNREFINED OILS

(75) Inventors: Shuli Yan, Detroit, MI (US); Steven O. Salley, Grosse Pointe Park, MI (US); K. Y. Simon Ng, West Bloomfield, MI (US)

(73) Assignee: Wayne State University, Detroit, MI (US)

( * ) Notice: Subject to any disclaimer, the term of this patent is extended or adjusted under 35 U.S.C. 154(b) by 293 days.

(21) Appl. No.: 12/468,309

(22) Filed: May 19, 2009

(65) Prior Publication Data

US 2010/0010246 A1    Jan. 14, 2010

Related U.S. Application Data

(60) Provisional application No. 61/054,205, filed on May 19, 2008.

(51) Int. Cl.
*C11C 3/10* (2006.01)
(52) U.S. Cl. .................. 554/169; 554/227; 502/303
(58) Field of Classification Search .................. 554/169, 554/227; 502/303
See application file for complete search history.

(56) References Cited

U.S. PATENT DOCUMENTS

| | | | |
|---|---|---|---|
| 4,161,463 A | 7/1979 | Myers et al. |
| 5,354,878 A | 10/1994 | Connemann et al. |
| 5,525,126 A | 6/1996 | Basu et al. |
| 5,908,946 A | 6/1999 | Stern et al. |
| 6,147,196 A | 11/2000 | Stern et al. |
| 6,211,390 B1 | 4/2001 | Peter et al. |
| 6,359,157 B2 | 3/2002 | Peter et al. |
| 7,396,962 B1 | 7/2008 | Dubois et al. |
| 2003/0195367 A1 | 10/2003 | Barrault et al. |
| 2007/0161828 A1 | 7/2007 | Kibino et al. |
| 2008/0214880 A1 | 9/2008 | Dubois et al. |

FOREIGN PATENT DOCUMENTS

| | | | |
|---|---|---|---|
| CN | 1 966 142 | | 5/2007 |
| CN | 1966142 | * | 5/2007 |
| DE | 3932514 A1 | | 4/1991 |
| DE | 4123928 A1 | | 1/1993 |
| DE | 4209779 C1 | | 7/1993 |
| FR | 2 866 653 | | 8/2005 |
| FR | 2866653 A1 | * | 8/2005 |
| FR | 2882052 A1 | | 8/2006 |
| FR | 2882053 A1 | | 8/2006 |
| JP | 2006-104316 A | | 6/2006 |
| JP | 2008-274030 A | | 11/2008 |
| WO | 2005/116168 | | 12/2005 |
| WO | WO 2005116168 A1 | * | 12/2005 |
| WO | WO 2008/012275 A1 | | 1/2008 |
| WO | 200/041038 | | 4/2008 |
| WO | WO 2008041038 A1 | * | 4/2008 |

OTHER PUBLICATIONS

Babu, N. Seshu et al., "Room-Temperature Transesterification of Edible and Nonedible Oils Using a Heterogeneous Strong Basic Mg/La Catalyst," Energy & Fuels, 2008, vol. 22, pp. 1965-1971.

(Continued)

*Primary Examiner* — Deborah D Carr
(74) *Attorney, Agent, or Firm* — Brinks Hofer Gilson & Lione

(57) ABSTRACT

A method of forming a biodiesel product and a heterogeneous catalyst system used to form said product that has a high tolerance for the presence of water and free fatty acids (FFA) in the oil feedstock is disclosed. This catalyst system may simultaneously catalyze both the esterification of FAA and the transesterification of triglycerides present in the oil feedstock. The catalyst system according to one aspect of the present disclosure represents a class of zinc and lanthanum oxide heterogeneous catalysts that include different ratios of zinc oxide to lanthanum oxides (Zn:La ratio) ranging from about 10:0 to 0:10. The Zn:La ratio in the catalyst is believed to have an effect on the number and reactivity of Lewis acid and base sites, as well as the transesterification of glycerides, the esterification of fatty acids, and the hydrolysis of glycerides and biodiesel.

19 Claims, 13 Drawing Sheets

OTHER PUBLICATIONS

Kawashima, Ayato et al., "Development of heterogeneous base catalysts for biodiesel production," Bioresource Technology, vol. 99, 2008, pp. 3439-3443.

Li, Xu et al., "A novel solid superbase of $Eu_2O_31Al_2O_3$ and its catalytic performance for the transesterification of soybean oil to biodiesel," Catalysis Communications, 8, 2007, pp. 1969-1972.

International Search Report—PCT/US2009/044528—mailed on Oct. 2, 2009.

Article Entitled Simultaneous Transesterification and Esterification of Unrefined or Waste Oils Over $ZnO-La_2O_3$ Catalysts, by Shuli Yan et al., Published by Elsevier B.V., doi:10.1016/j.apcata.2008.10.053, Department of Chemical Engineering and Materials Science, Wayne State University, Detroit, MI 48202, Applied Catalysis A: General 353 (2009) 203-212.

International Search Report of PCT/US2010/038773 Mailed Nov. 15, 2010.

* cited by examiner

METHODS AND CATALYSTS FOR MAKING BIODIESEL FROM THE TRANSESTERIFICATION AND ESTERIFICATION OF UNREFINED OILS

This application claims the benefit of U.S. Provisional Application Ser. No. 61/054,205 filed on May 19, 2008, entitled "SIMULTANEOUS TRANSESTERFICATION AND ESTERFICATION OF UNREFINED OILS TO BIODIESEL OVER ZNO—La2O3 CATALYSTS," the entire contents of which are incorporated herein by reference.

FEDERALLY SPONSORED RESEARCH AND DEVELOPMENT

This invention was made with government support under Contract No. DEFG36-05G085005 awarded by the U.S. Department of Energy. The U.S. government may retain certain rights to the invention.

FIELD

This invention relates generally to biodiesel products. More specifically, this invention pertains to heterogeneous catalysts and methods used to form a biodiesel product using an unrefined or waste oil feedstock.

BACKGROUND

Biodiesel, which is a renewable fuel that has similar combustion properties to fossil diesel, is normally produced by the transesterification of highly refined oils with short-chain alcohols. Since biodiesel can significantly decrease the emission of $CO_2$, $SO_x$, and unburned hydrocarbons from the exhaust of motor vehicles, it is environmentally beneficial, and therefore, a promising alternative to fossil diesel.

Biodiesel is typically produced in a conventional manufacturing operation via the catalyzed transesterification reaction of triglyceride as depicted in Equation 1. In this reaction the oil or fat is reacted with an alcohol to form the biodiesel and glycerine. Such a conventional operation will usually use a strong basic (e.g., NaOH or KOH) or acidic (e.g., $H_2SO_4$) solution as a homogeneous catalyst and food-grade vegetable oils as the raw material. These homogeneous catalysts are quite sensitive to the presence of free fatty acids (FFA) and water in the oil feedstock. FFA is known to react with basic catalysts (i.e., NaOH or KOH) to form soaps. The formation of soaps will subsequently complicate the separation of glycerol from the reaction mixture, thereby, drastically reducing the yield of methyl esters.

The presence of water in the oil feedstock will also lead to the hydrolysis of the oils and fatty acid methyl esters (FAME) when a strong basic or acidic catalyst is present. Thus, inexpensive oils, such as crude vegetable oils, waste cooking oil, and other rendered animal fats, that generally contain a high content of FFA and water cannot be directly utilized in a conventional process.

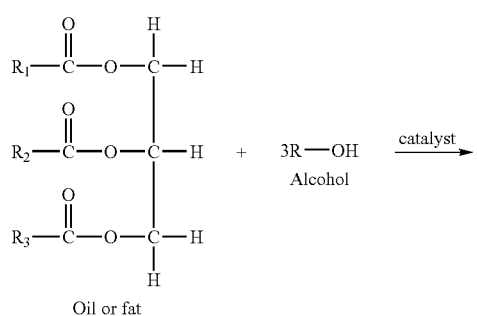

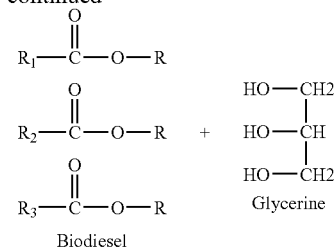

Eq. 1

The FFA content in the oil feedstock used in a conventional process with a homogenous catalyst should be less than about 0.5 weight percent, while the water content should be less than about 0.06 weight percent. For this reason, highly refined oils are normally preferred for use in a conventional process for biodiesel production. The cost of the oil feedstock used in a conventional process can account for up to a total of 80% of the cost to produce biodiesel. However, with recent increases in the price for refined oils, the cost of the oil feedstock may account for an even higher fraction of the total production cost. The development of a new catalytic process that could use unrefined and waste oils directly would be advantageous in that it would lower the manufacturing cost for biodiesel.

An acid- and alkali-catalyzed two-step method for biodiesel production that may use a small amount of unrefined or waste oils as a raw material is known. In this two-step method, an acidic catalyst ($H_2SO_4$, HCl) is initially used to convert FFA to various esters in the first step. Then in the second step, the transesterification of oil is performed using an alkaline catalyst, i.e., NaOH or KOH. Although this method of producing biodiesel may utilize some unrefined or waste oils, the process requires multiple reactions, washing, and product separation operations, and is not an environmentally benign process. For example, the strong acidic or basic catalysts used in this process are highly corrosive and will need to be removed from the biodiesel product through multiple washing steps. Thus a two-step production process results in the generation of a significant amount of waste water, as well as a continual loss of catalyst, thereby increasing the production cost for the biodiesel product.

SUMMARY

The present invention provides a method of forming a biodiesel product from unrefined or waste oils. The method includes preparing a heterogeneous catalyst system that comprises a mixture of zinc and lanthanum oxides. An unrefined oil feedstock and an alcohol are then placed in contact with the catalyst system to form a reaction mixture. The reaction mixture includes a combination of triglycerides, alcohol, free fatty acids in a concentration that is greater than about 0.5 wt. %, and water in a concentration that is greater than about 1 wt. %. The reaction mixture is heated to a temperature between about 170° C. and 220° C. in order to cause the transesterification of triglycerides in the oil feedstock and the esterification of fatty free acids in the oil feedstock to simultaneously occur. The reaction is allowed to proceed for a predetermined amount of time to form fatty acid methyl esters and result in a biodiesel product. Finally, the catalyst is separated from the biodiesel product in order to collect the biodiesel product.

According to yet another aspect of the present invention, a novel heterogeneous catalyst system used for the production of a biodiesel product from unrefined or waste oils is described. The catalyst system comprises zinc oxide having a mean grain size between about 9.8 and 27.6 nanometers and a mixture of lanthanum oxides. The combination of zinc and lanthanum oxides has a Zn:La bulk molar ratio between about 1.2:1:0 and 8.9:1.0 and a surface area between about 14.9 and 16.8 m$^2$/gram. The zinc and lanthanum oxide catalysts may also have a surface composition comprising between about 4.2-26.8% $Zn^{2+}$, about 2.1-2.9% $La^{3+}$, and about 23.2-32.9% $O_{lat}$, a surface atom ratio for $Zn^{2+}$:$La^{3+}$ that is between about 1.4:1.0 and 11.6:1.0, and a surface atom ratio for ($Zn^{2+}$+$La^{3+}$):$O_{lat}$ that is between about 0.2:1.0 and 1.1:1.0. The zinc and lanthanum oxide catalyst is preferably one selected from the group of Zn10La0, Zn1La1, Zn3La1, Zn9La1, and Zn0La10, with a Zn3La1 catalyst system being especially preferred.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
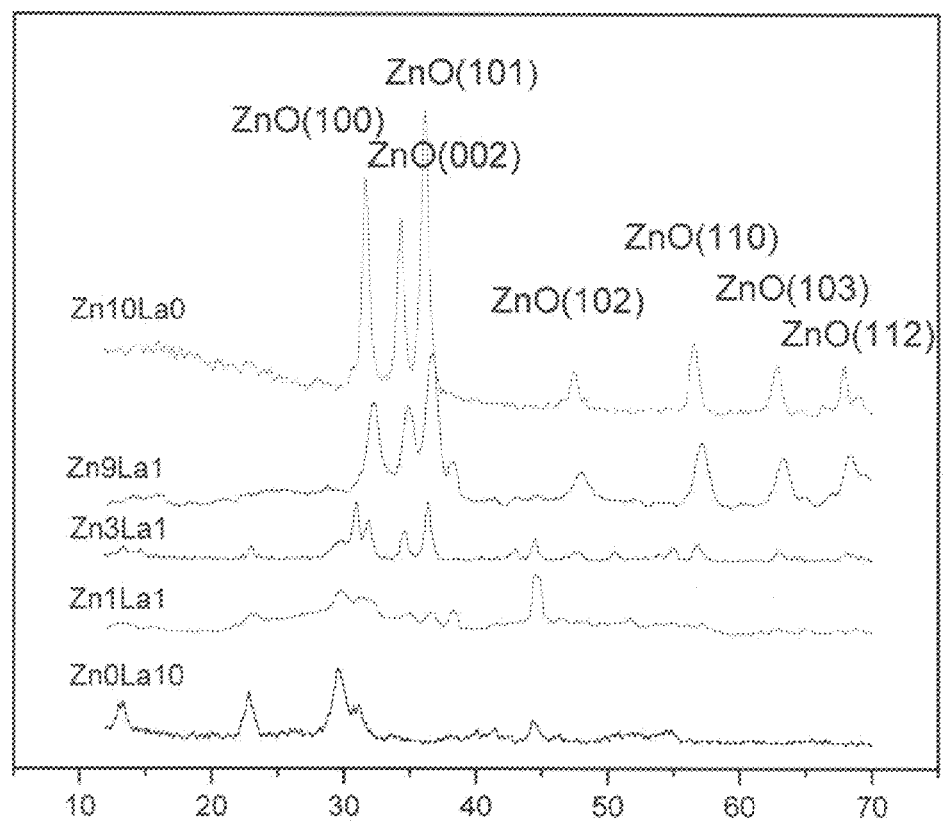
FIG. 1 is measured x-ray diffraction (XRD) spectra used to identify and compare the structure and composition of the various zinc and lanthanum mixed metal oxide catalysts prepared according to the teachings of the present disclosure.

The following description is merely exemplary in nature and is in no way intended to limit the present disclosure or its application or uses. It should be understood that throughout the description and drawings, corresponding reference numerals indicate like or corresponding parts and features.

The present invention generally provides a heterogeneous catalyst system that has a high tolerance to the presence of water and free fatty acids (FFA) in the oil feedstock used to prepare a biodiesel product. This catalyst system may simultaneously catalyze both the esterification of FAA and the transesterification of triglycerides present in the oil feedstock. The catalyst system according to one embodiment of the present disclosure represent a class of zinc and lanthanum oxide heterogeneous catalysts that include different ratios of zinc oxide to lanthanum oxides (Zn:La ratio) ranging from about 10:0 to 0:10. The Zn:La ratio in the catalyst is believed to have an effect on the number and reactivity of Lewis acid and base sites, as well as the transesterification of glycerides, the esterification of fatty acids, and the hydrolysis of glycerides and biodiesel.

Preferably, the heterogeneous catalyst system used for the production of a biodiesel product from unrefined or waste oils comprises zinc oxide that has a mean grain size between about 9.8 and 27.6 nanometers; and a mixture of lanthanum oxides. The combination of zinc and lanthanum oxides has a Zn:La bulk molar ratio between about 1.2:1:0 and 8.9:1.0; a surface area between about 14.9 and 16.8 m$^2$/g, a surface composition comprising between about 4.2-26.8% $Zn^{2+}$, about 2.1-2.9% $La^{3+}$, and about 23.2-32.9% $O_{lat}$, a surface atom ratio for $Zn^{2+}$:$La^{3+}$ between about 1.4:1.0 and 11.6:1.0, and a surface atom ratio for ($Zn^{2+}$+$La^{3+}$):$O_{lat}$ between about 0.2:1.0 and 1.1:1.0.

The mixture of lanthanum oxides may be selected as one from the group of $La_2CO_5$, LaOOH, and combinations or mixtures thereof, while the zinc oxide is typically provided as ZnO. A catalyst composition that is particularly preferred for use in a reaction to form a biodiesel product includes a combination of zinc and lanthanum oxides that have a Zn:La bulk molar ratio of about 3.5:1:0; a surface area of about 15.7 m$^2$/g, a surface composition comprising about 26.8% $Zn^{2+}$, about 2.8% $La^{3+}$, and about 30.5% $O_{lat}$, a surface atom ratio for $Zn^{2+}$:$La^{3+}$ of about 9.6:1.0, and a surface atom ratio for ($Zn^{2+}$+$La^{3+}$):$O_{lat}$ of about 1.0:1.0. A preferred catalyst composition is Zn3La1, although other catalyst compositions including but not limited to Zn10La0, Zn9La1, Zn1La1, and Zn0La10 may be used.

The characterization of the zinc and lanthanum metal oxide catalysts of the present disclosure by x-ray diffraction (XRD) and energy dispersive spectrometry (EDS) are summarized in Table 1, as well as in the XRD spectra shown in FIG. 1. Referring to FIG. 1, the XRD pattern of Zn10La0 corresponds to the hexagonal wurtzite structure of zinc oxide. The pattern of Zn0La10 shows a mixture of $La_2CO_5$ and LaOOH. The diffraction patterns observed for Zn9La1, Zn3La1, and Zn1La1 show lower intensity than Zn10La0, and mixed ZnO, $La_2CO_5$, and LaOOH are found in Zn9La1, Zn3La1, and Zn1La1. As the lanthanum content increases, a transition from bulk ZnO structures to a mixture of zinc-lanthanum oxide structures occurs.

Figure 2:
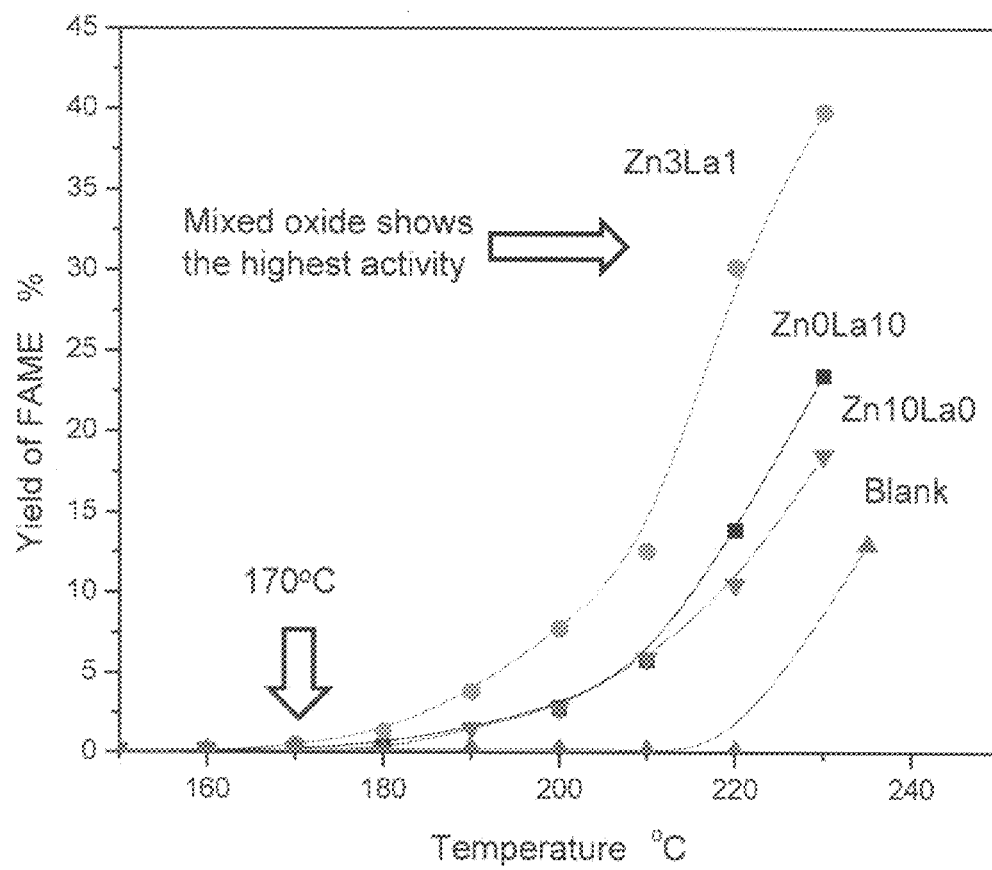
FIG. 2 is a graphical representation of the yield of fatty acid methyl esters (FAME) from transesterification reactions using a Zn10La0, Zn3La1, or Zn0La10 catalyst plotted as a function of temperature.
Figure 3:
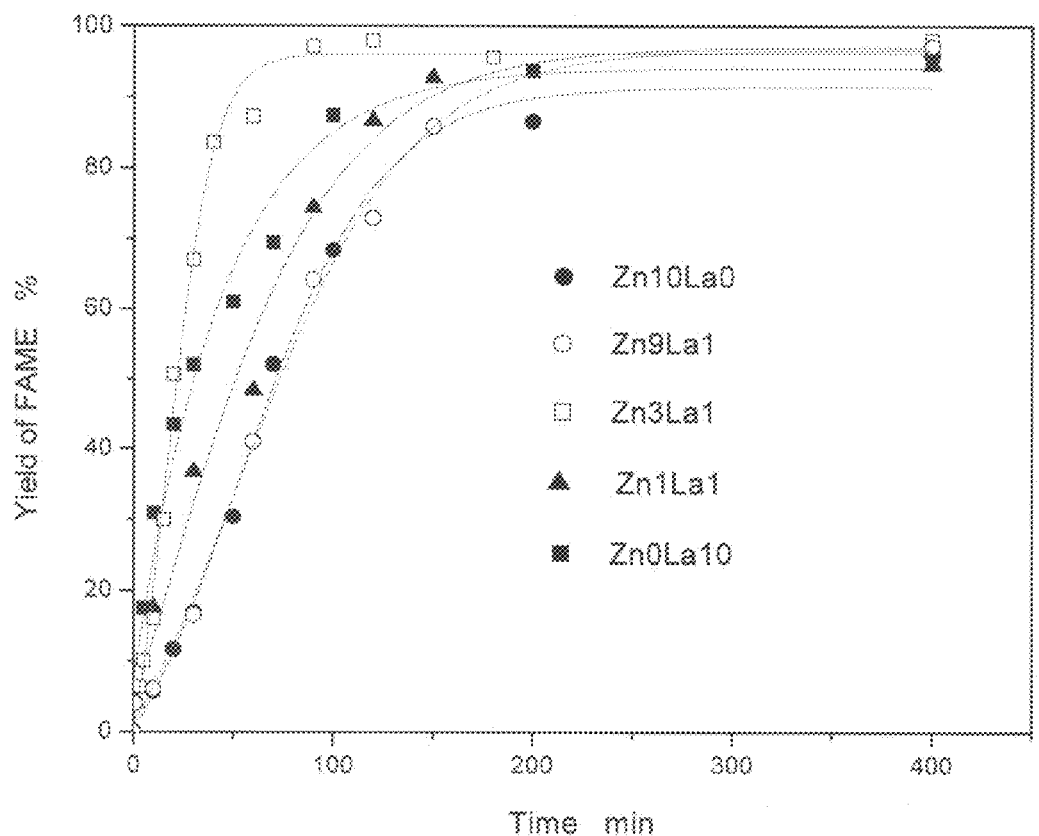
FIG. 3 is a graphical representation of the yield of FAME from transesterification reactions using a Zn10La0, Zn9La1, Zn3La1, Zn1La1, or Zn0La10 catalyst at 200° C. plotted as a function of time.

The mean grain size of ZnO in Zn9La1, Zn3La1, and Zn1La1 was calculated using the known Deby-Scherrer equation based on the peak of ZnO (1 0 1) shown in FIG. 1. The bulk molar ratios of zinc to lanthanum as determined by EDS are summarized in Table 1. Referring to Table 1, the mean grain size of ZnO decreases with the addition of lanthanum, suggesting that a strong interaction between La and Zn species may enhance the dispersion of ZnO. FIGS. 2 and 3 show that the mixed ZnO—$La_2O_3$ catalysts (Zn9La1, Zn3La1, and Zn1La1) have higher catalytic activities than pure zinc oxide catalyst (Zn10La0), which correlates well with the effects of lanthanum on enhancing the dispersion of the ZnO.

the active centers for the transesterification and esterification reactions. One skilled-in-the-art will understand that other explanations may also be plausible.

The XRD patterns (FIG. 1) for Zn10La0, Zn9La1, Zn3La1, and Zn1La1 show a shift of the reflection peaks of ZnO (1 0 0), (0 0 2), (1 0 1). Lattice constants for the ZnO crystal were calculated (see Table 2). The increase of lattice constants with respect to a and c suggests partial incorporation of a $La^{3+}$ ion with the ZnO crystal resulting in a lattice distortion. This in turn may cause the crystal growth of wurtzite ZnO to be inhibited and the ZnO to be highly dispersed.

The specific surface area of the catalyst ranges from about 12.2 $m^2/g$ to about 16.8 $m^2/g$. No direct correlation with the amount of lanthanum loading is observable. The catalyst system may comprise both small particles and larger aggregations of particles.

The x-ray photoelectron spectroscopy (XPS) data used to characterize the Zn, La, and 0 elements on the surface of Zn10La0, Zn9La1, Zn3La1, Zn1La1, and Zn0La10 are summarized in Table 2. The binding energy of about 1021.9, 835.0, 530.6, and 528.9 eV can be attributed to $Zn^{2+}$, $La^{3+}$, $O_{ad}$ (adsorbed oxygen), and $O_{lat}$ (lattice oxygen), respec-

TABLE 1

| Catalyst | XRD Structure | Mean Grain Size of ZnO (nm) | Lattice Constants for ZnO Phase | | | Density (C) | Zn:La (bulk molar ratio) | Specific Surface Area ($m^2/g$) |
|---|---|---|---|---|---|---|---|---|
| | | | a (Å) | c (Å) | Vol ($Å^3$) | | | |
| Zn10La0 | ZnO | >100 | 3.25 | 5.21 | 47.63 | 5.68 | 1.0:0 | 16.3 |
| Zn9La1 | ZnO | 27.6 | 3.25 | 5.36 | 48.62 | 5.56 | 8.9:1.0 | 16.8 |
| Zn3La1 | ZnO, $La_2CO_5$ LaOOH | 17.1 | 3.25 | 5.23 | 47.81 | 5.65 | 3.5:1.0 | 15.7 |
| Zn1La1 | ZnO, $La_2CO_5$ LaOOH | 9.8 | 3.33 | 5.10 | 49.12 | 5.50 | 1.2:1.0 | 14.9 |
| Zn0La10 | $La_2CO_5$ LaOOH | / | / | / | / | / | 0:1.0 | 12.2 |

The XRD pattern of Zn3La1 (FIG. 1) shows the presence of a mixture of ZnO, $La_2CO_5$, and LaOOH phases. Various polar crystal planes of ZnO, such as ZnO (0 0 2), (1 0 2), (1 0 3), and (1 1 2), are observed. On these polar crystal planes, the amount of oxygen atoms is not equal to zinc atoms. Thus these crystal faces may exhibit electronic properties and reactant molecules may preferentially adsorb on these polar faces. Thus these polar surfaces are believed to be associated with tively. For metal oxides, the lattice oxygen on the surface represents the Lewis base sites, while the metal ions represent the Lewis acid sites. Lewis base sites can be considered catalytic sites for transesterification reactions and Lewis acid sites as the active sites for esterification reactions. Therefore, a correlation may exist between surface concentrations of $O_{lat}$, $Zn^{2+}$, and $La^{3+}$ with the activities associated with the esterification and transesterification reactions.

TABLE 2

| | Binding Energy (eV) | | | | Surface Percentage (at. %) | | | $Zn^{2+}$ & $La^{3+}$ | $Zn^{2+}$, $La^{3+}$ & $O_{lat}$ | Surface Atom Ratio | |
|---|---|---|---|---|---|---|---|---|---|---|---|
| Samples | $La_{3d}$ | $O_{lat}$ | $O_{ads}$ | $Zn_{2p}$ | $O_{lat}$ | $Zn^{2+}$ | $La^{3+}$ | | | $Zn^{2+}:La^{3+}$ | $(Zn^{2+} + La^{3+}):O_{lat}$ |
| Zn10La0 | \ | 528.9 | 530.6 | 1021.9 | 19.9 | 10.2 | \ | 10.2 | 30.1 | \ | 0.5 |
| Zn9La1 | 836.8 | 530.2 | 531.8 | 1021.6 | 23.2 | 24.4 | 2.1 | 26.5 | 49.7 | 11.6:1 | 1 |
| Zn3La1 | 835.7 | 530.2 | 531.5 | 1021.4 | 30.5 | 26.8 | 2.8 | 29.6 | 60.1 | 9.6:1 | 1 |
| Zn1La1 | 835.3 | 530.1 | 531.4 | 1021.1 | 32.9 | 4.2 | 2.9 | 7.1 | 40 | 1.4:1 | 0.2 |
| Zn0La10 | 835 | 530.3 | 531.7 | \ | 37.5 | \ | 7.9 | 7.9 | 45.4 | \ | 0.2 |

The effect of La³⁺ concentration on the fraction of basic and acid sites is demonstrated in Table 2. The percentages of surface lattice oxygen (base sites) increases with the lanthanum content in the mixed catalyst system. On the other hand, the surface content of $Zn^{2+}$ and $La^{3+}$ in Zn3La1 are higher than in Zn10La0, Zn9La1, Zn1La1, and Zn0La10. This suggests that there may be an optimal lanthanum loading that will maximize the number of surface acid sites. After combining the data that represents both the acid and base sites, Zn3La1 again exhibits the highest surface percentage of $O_{lat}$, $Zn^{2+}$ and $La^{3+}$, as compared to other catalysts. This fact correlates well with the transesterification activities (FIGS. 2, 3) and the measured XRD data (Table 1).

Shifts in the binding energies associated with $O_{lat}$, $Zn_{2p}$, and $La_{3d}$ are observed (see Table 2). The binding energies of $O_{lat}$ in Zn9La1, Zn3La1, and Zn1La1 are higher than in Zn10La0, while binding energies of $Zn_{2p}$ in Zn9La1, Zn3La1, and Zn1La1 are lower than in Zn10La0. Moreover, the binding energy of $La_{3d}$ decreases with an increase in the La content. These shifts in the binding energy may be attributed to the electron transfer from the lattice oxygen atoms to the metal atoms. This suggests that La can act as an electron promoter, enhancing the interaction of reactant molecules with the catalyst surface sites.

The catalyst system of the present disclosure may be used to facilitate the transesterification of triglyceride found in an oil feedstock. Triglyceride is typically the major component of vegetable oils. Various catalyst compositions prepared according to the teachings of the present disclosure can be compared with respect to their catalytic activity in facilitating the transesterification of a food-grade soybean oil, i.e., an oil containing about 99.5 wt. % triglycerides. A summary of the catalytic activity associated with mono-metal oxide (Zn10La0, Zn0La10) and mixed metal oxides (Zn3La1) for the transesterification of an oil is provided in FIG. 2. All of the data (FIG. 2) was obtained using a step-rising heating method, e.g., a heating rate of 2° C./minute with the reaction being held at the target temperature for 1 minute. All three catalysts show activity in catalyzing the transesterification reaction when the reaction temperature is higher than 170° C. When no catalyst is present, the transesterification reaction starts at 220° C. The mono-metal oxides have similar activities, while the mixed oxides (Zn3La1) clearly show an enhanced activity as compared to the mono-metal oxides (Zn10La0 and Zn0La10). In other words, Zn3La1 shows the highest activity when compared to Zn10La0 or Zn0La10.

Referring to FIG. 3, the effect that different molar ratios of zinc to lanthanum in the composition of the catalyst has on the transesterification reaction is shown. The temperature of the reaction mixture was held at 20° C. The time period over which the reaction reaches chemical equilibrium is about 60, 80, 120, 150, and 200 minutes for Zn3La1, Zn0La10, Zn1La1, Zn9La1, and Zn10La0, respectively. The catalyst system with a 3:1 molar ratio of zinc to lanthanum shows the highest reactivity for oil transesterification.

Figure 4:
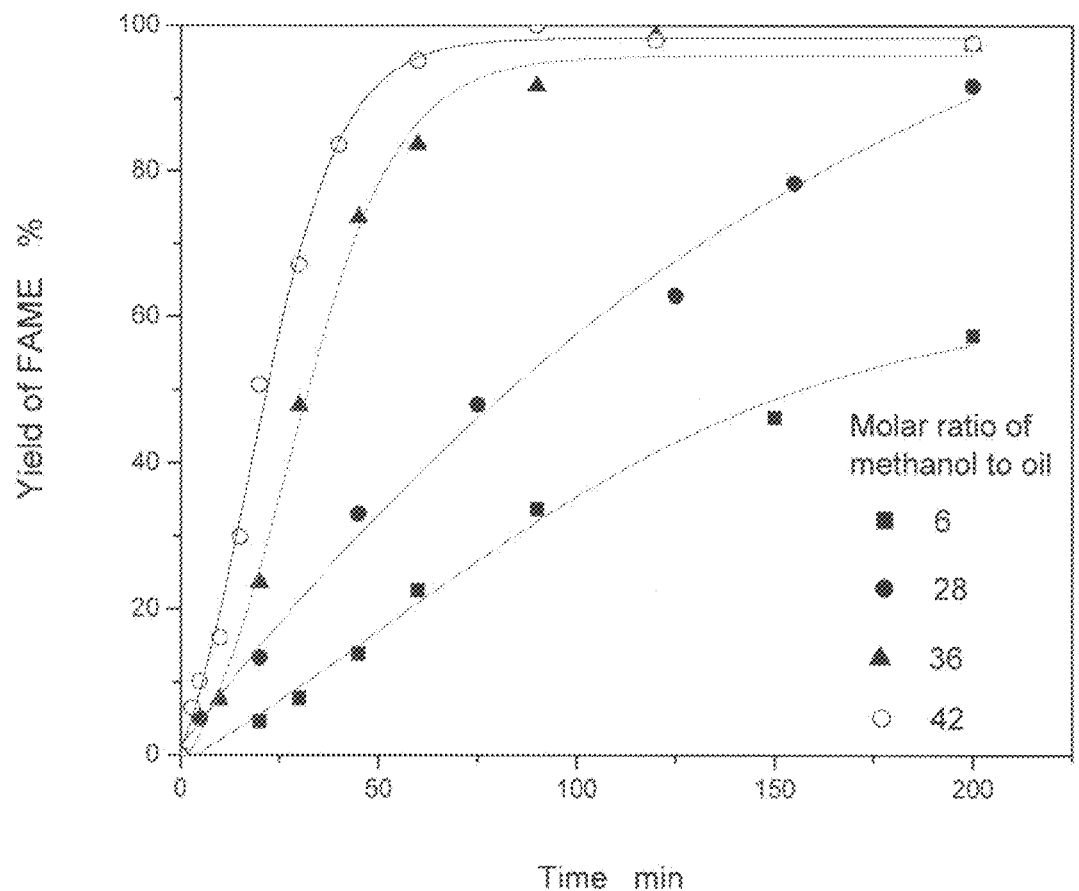
FIG. 4 is a graphical representation according to another aspect of the present disclosure of the yield of FAME in a transesterification reaction using various molar ratios of methanol to oil at 200° C. plotted as a function of time.
Figure 5:
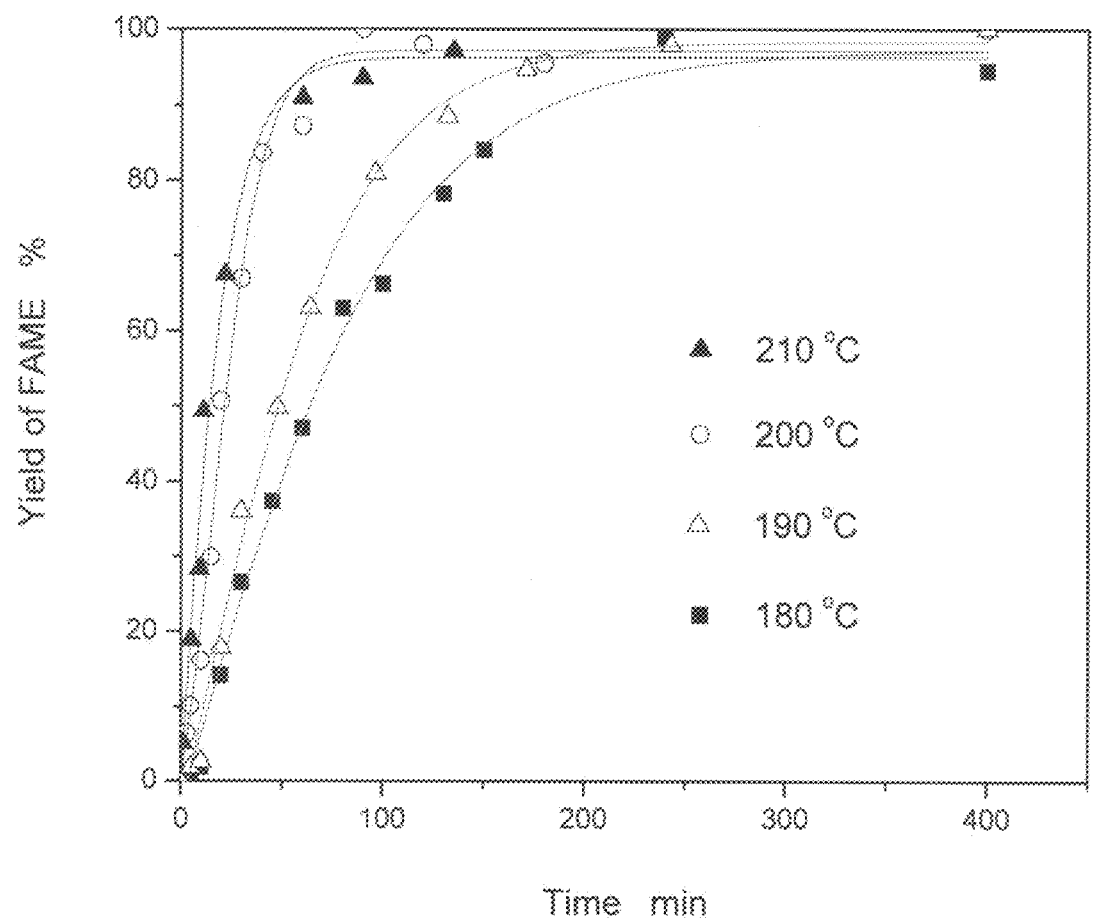
FIG. 5 is a graphical representation of the yield of FAME in a transesterification reaction conducted at different temperatures plotted as a function of time.

The effect that the initial molar ratio of methanol to oil present in the feedstock and the effect that reaction temperature has on the Zn3La1 catalyzed transesterification process are shown in FIGS. 4 and 5, respectively. Since the methanol concentration was kept in excess, a power rate law model can be written as shown in Equation 2 where $r_0$ is the initial reaction rate (for <15% FAME yield), $k_1$ is the apparent reaction rate constant, $C_{oil,0}$ is the initial oil concentration, and α is the reaction order.

$$-r_o = k_1 C_{oil,o}^\alpha \qquad \text{Eq. 2}$$

Referring to FIG. 4, the apparent reaction order for the oil is about 1.08. In FIG. 5, the effect of reaction temperature on the transesterification reaction is shown when the initial molar ratio of methanol to oil is 42:1. The apparent activation energy, $E_{app}$, is about 91.28 KJ/mol. This activation energy is higher than the reported $E_{app}$ using a NaOH catalyst.

According to another aspect of the present disclosure, the catalyst may simultaneously esterify FFA into biodiesel. FFA can be present in a substantial amount in unrefined or waste oils. An example of a free fatty acid whose properties and performance may represent other fatty acids is oleic acid. The esterification of a fatty acid with methanol in the presence of a catalyst is depicted by Equation 3.

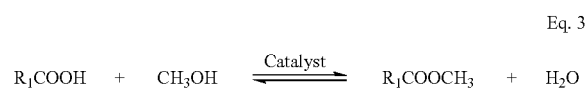

$$R_1COOH + CH_3OH \xrightleftharpoons{\text{Catalyst}} R_1COOCH_3 + H_2O \qquad \text{Eq. 3}$$

Figure 6A:
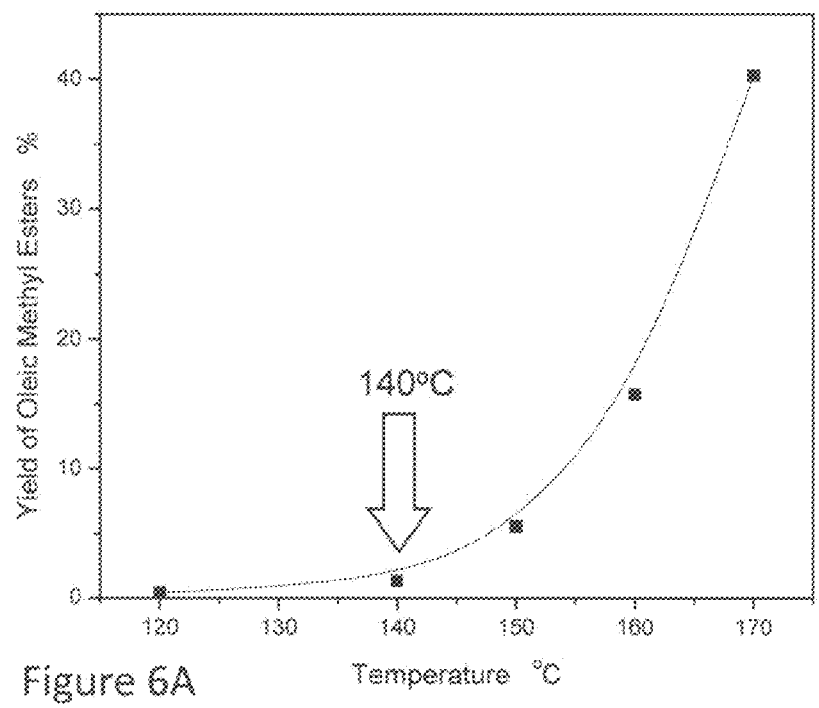
FIG. 6A is a graphical representation of the yield of oleic methyl esters for a Zn3La1 catalyst in a reaction using pure oleic acid plotted as a function of temperature.
Figure 6B:
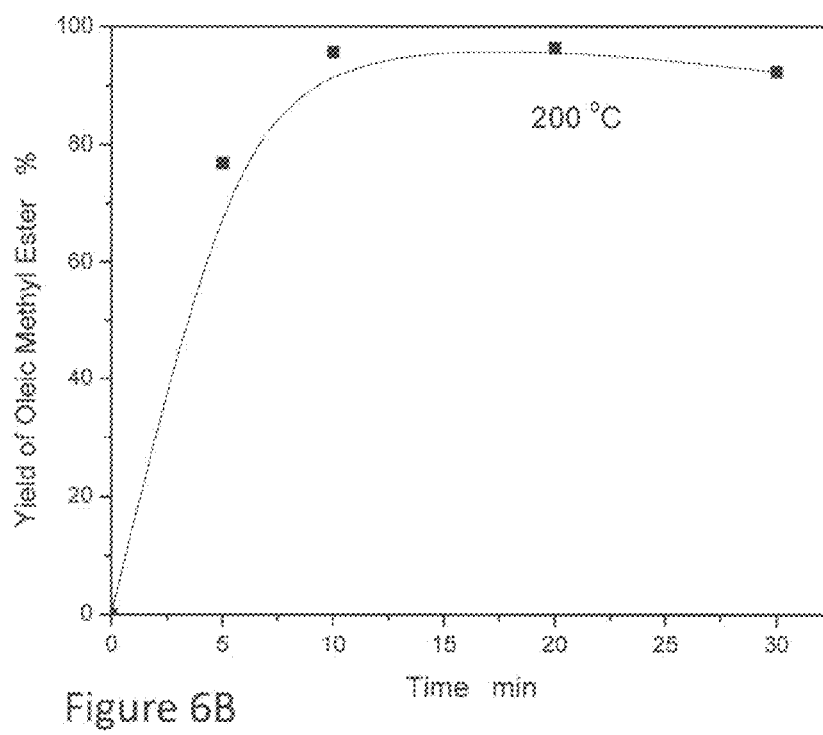
FIG. 6B is a graphical representation of the yield of oleic methyl esters from the reaction in FIG. 6A at 200° C. plotted as function of time.

In FIG. 6A, the results of using Zn3La1 in esterifying pure oleic acid with methanol using the step-rise heating method (i.e., a heating rate of 2° C./minute, and holding the reaction mixture at the target temperature for 1 minute) is provided. When the temperature is higher than 140° C., Zn3La1 shows activity in regards to the esterification of FAA. At 200° C., a 96% yield of oleic acid methyl ester can be obtained in 10 minutes (see FIG. 6B).

Figure 7:
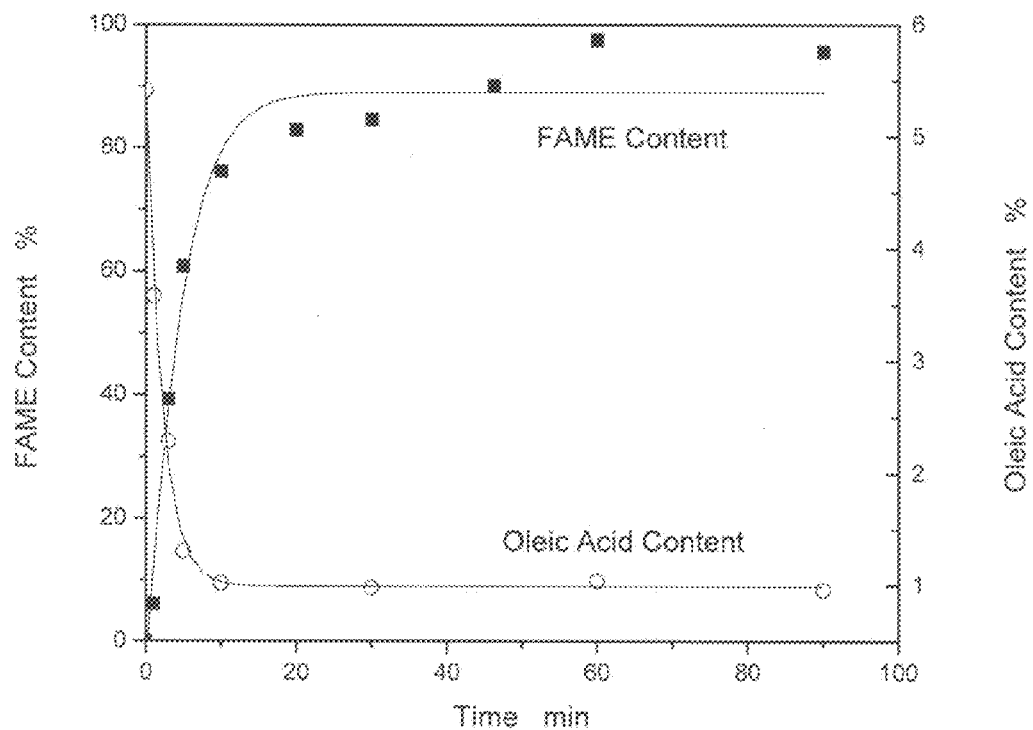
FIG. 7 is a graphical representation of the FAME content and oleic acid content obtained at 200° C. from a reaction between an oil feedstock and methanol in the presence of a Zn3La1 catalyst.

Since a considerable amount of FFA can exist in unrefined or waste oil feedstock, the catalyst system of the present disclosure is capable of esterifying the FFA with methanol in the presence of triglycerides. The reaction of a mixture oil containing 5.41 wt. % oleic acid and 94.59 wt. % food-grade soybean oil with excess methanol at 200° C. in the presence of a Zn3La1 catalyst is summarized in FIG. 7. The oleic acid content in the mixed oil quickly decreases in the first ten minutes. The yield of FAME approaches 95% after about 60 minutes. Thus the esterification reaction proceeds quickly and can occur simultaneously with the transesterification of the triglycerides in the oil.

Figure 8:
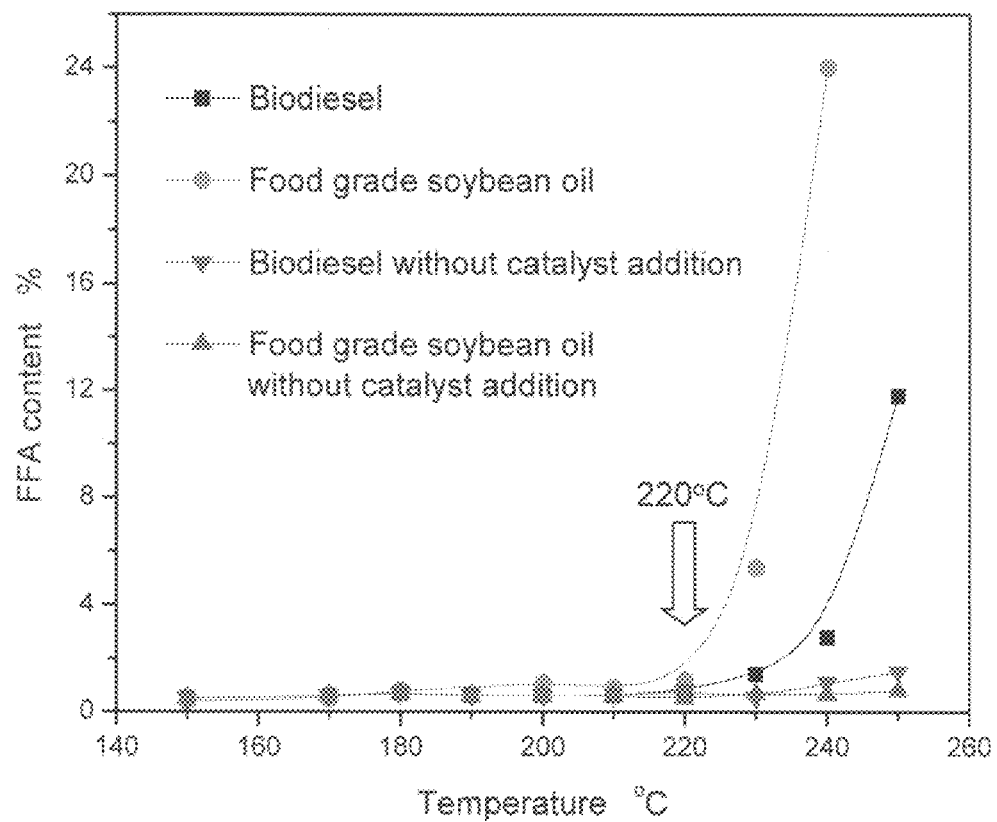
FIG. 8 is a graphical representation of the free fatty acids (FFA) content obtained upon the hydrolysis of biodiesel and soybean oil in both the presence of and in the absence of a Zn3La1 catalyst.

Since unrefined or waste oils generally contain a high content of water, the hydrolysis of biodiesel and oil are important side reactions that may decrease the overall yield of FAME, as well as increase the acidity of the reaction mixture. An increase in the acidity of the reaction mixture may decrease the longevity or lifetime of the manufacturing or production equipment. Referring now to FIG. 8, in the absence of a zinc and lanthanum mixed oxide catalyst, these hydrolysis reactions are not initiated even when the reaction temperature is elevated to 250° C. However, in the presence of a Zn3La1 catalyst, the hydrolysis begins to occur when the temperature exceeds 220° C. Since hydrolysis is not desirable, a reaction temperature that is lower than 220° C. is preferred for the production of a biodiesel product.

Figure 9:
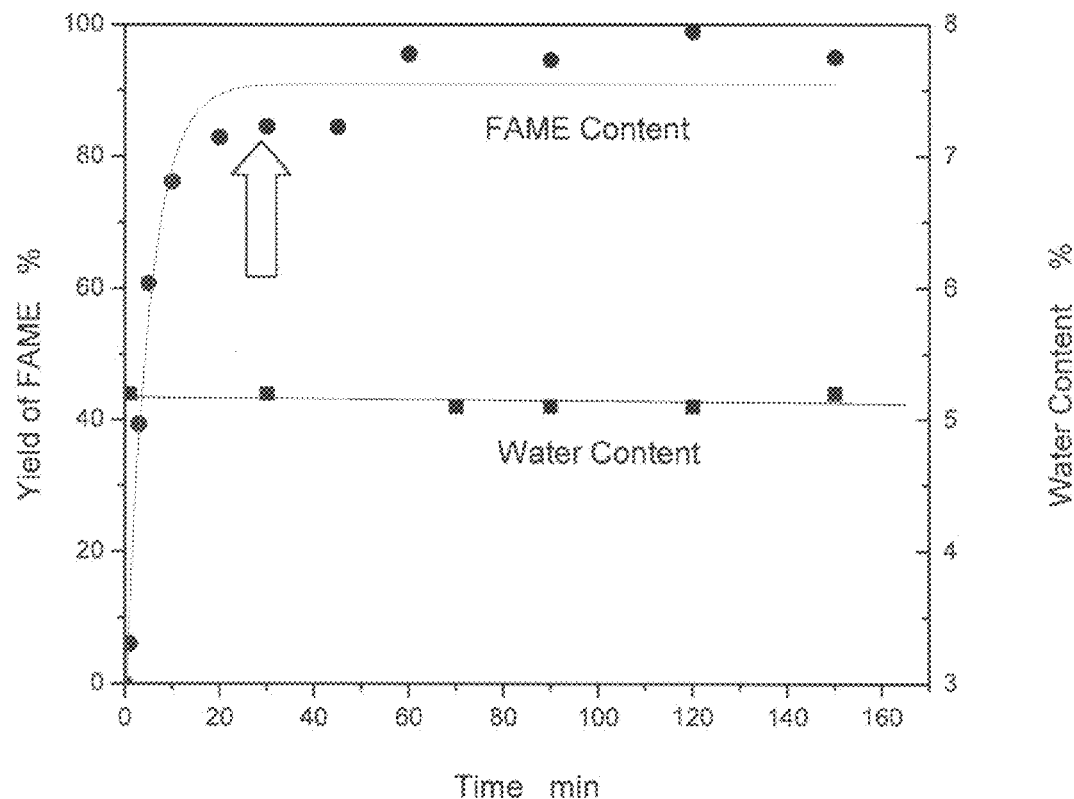
FIG. 9 is a graphical representation of the yield of FAME and water content obtained from a reaction at 200° C. between an oil feedstock and methanol in the presence of a Zn3La1 catalyst.

An overall yield of 93.0% FAME can be obtained with a Zn3La1 catalyst and an oil feedstock comprising a mixture of 5.30 wt. % water and 94.70 wt. % food-grade soybean oil at 200° C. as shown in FIG. 9. During the reaction, the water content present in the reactants may be maintained at about 5.2%. In this reaction mixture at 200° C., there is little to no occurrence of a hydrolysis reaction in regards to the biodiesel and triglycerides as shown in Equation 4.

Eq. 4

FFA and water are usually considered as poisons to both homogeneous acidic and basic catalysts in traditional biodiesel production processes. However, the presence of FFA or water does not dramatically affect the zinc and lanthanum oxide catalyst system of the present disclosure. The limited effect of FFA and water on the activity of Zn3La1 catalyst in regards to the esterification of food grade soybean oils with 5, 10, 15, and 30% concentration of oleic acid, with 1, 3, and 5% of water, and with 5% of oleic acid and 3% of water are shown in FIGS. 10A-10D.

Figure 10A:
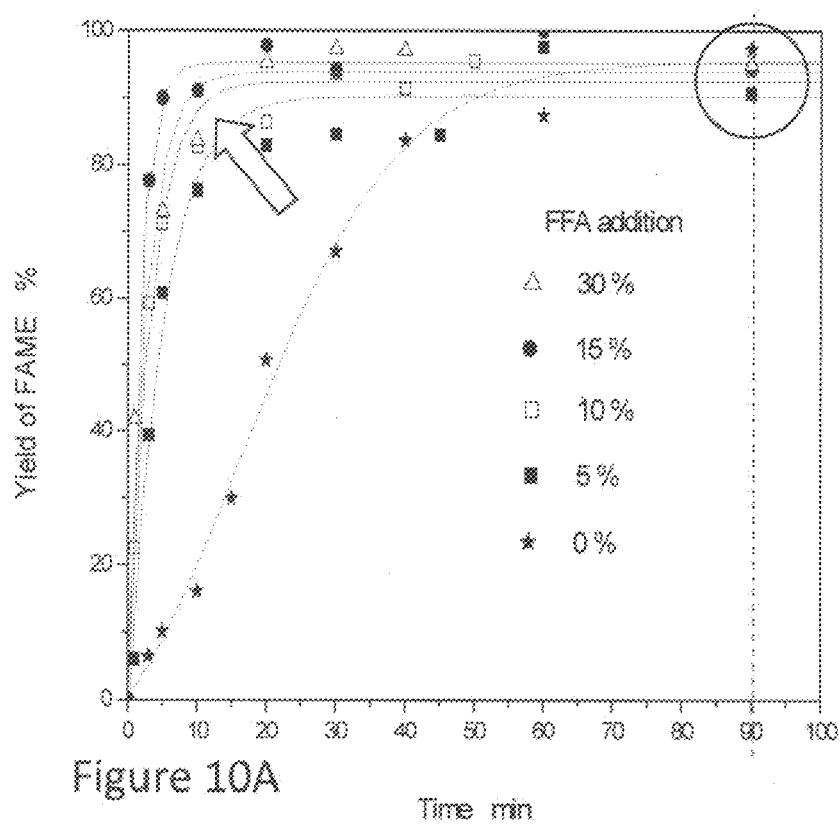
FIG. 10A is a graphical representation of the effect of FFA addition on the yield of FAME in a transesterification reaction being performed according to one aspect of the present disclosure.

In FIG. 10A, the addition of FAA (e.g., oleic acid) accelerates the reaction rate and shortens the time to achieve a high yield of FAME. For example, without FFA addition, about 60 minutes is needed or at least preferred to reach an equilibrium yield of FAME. In comparison, after the addition of 5% FFA the time in which an equilibrium is reached decreases to about 20 minutes. With further additions of FFA, the time to reach equilibrium decreases further.

Figure 10B:
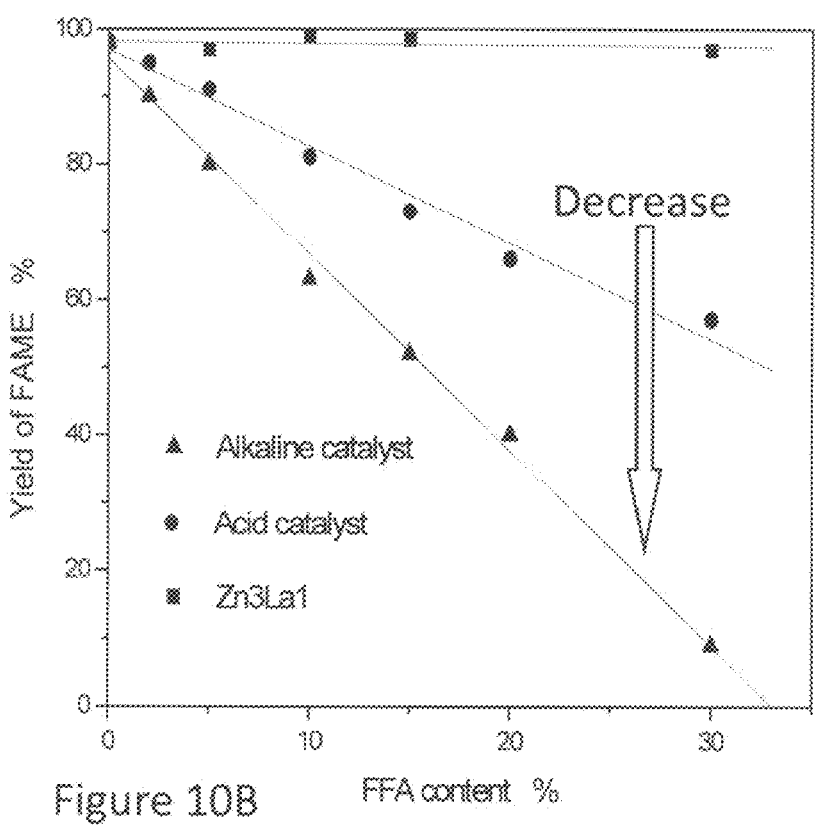
FIG. 10B is a graphical representation of the effect of FFA content on the equilibrium yield of FAME in the presence of an alkaline catalyst, an acid catalyst, or a Zn3La1 catalyst.

In FIG. 10B, the effect of FFA addition on the equilibrium yields of FAME using $H_2SO_4$, NaOH, and Zn3La1 catalyst systems is compared. The acid catalytic process reaction used 3% sulfuric acid as the catalyst along with a molar ratio of methanol to oil of 6:1, a reaction temperature of 60° C., and a reaction time of 96 hours. The alkaline catalytic process reaction used 1% NaOH as the catalyst along with a molar ratio of methanol to oil of 6:1, a reaction temperature of 25° C., and a reaction time of 8 hours. The heterogeneous catalytic process reaction used 2.3 wt. % Zn3La1 as the catalyst along with a molar ratio of methanol to oil of 36:1, a reaction temperature of 200° C., and a reaction time of 1.5 hours.

A sharp decrease in the yield of FAME is observed in the processes that used either $H_2SO_4$ or NaOH as the catalyst system. FIG. 10B demonstrates that even with as little as 5% FFA present in the oil, the yield of FAME decreases to 78% and 88% in NaOH catalyzed and $H_2SO_4$ catalyzed processes, respectively. In comparison, the yield of FAME is maintained at 96% in the Zn3La1 catalyzed process when FAA is present in a quantity ranging from <5% to >30%. At a 30% FFA addition, the FAME yield decreases to 10% and 60% in NaOH catalyzed and $H_2SO_4$-catalyzed processes, respectively, while the FAME yield is maintained at 96% in a Zn3La1-catalyzed process. Thus in comparison with conventional NaOH and $H_2SO_4$ catalyst systems, the Zn3La1 catalyst system has an unexpected tolerance to the presence of FFA in the oil feedstock during the transesterification reaction. Thus, this class of mixed metal oxides is uniquely suited for the direct conversion of acidic oils to a biodiesel product.

Figure 10C:
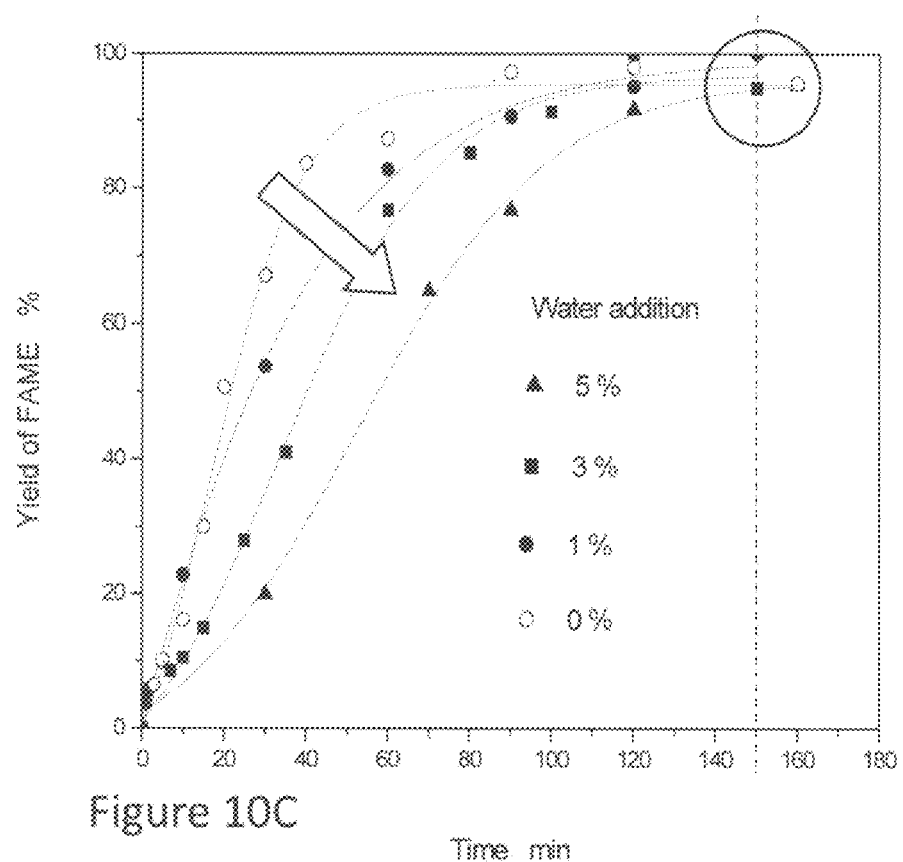
FIG. 10C is a graphical representation of the effect of water addition on the yield of FAME in a transesterification reaction being performed according to one aspect of the present disclosure.

The effect of water on the yield of FAME in a reaction mixture using Zn3La1 as catalyst is shown in FIG. 10C. The addition of water to the reaction mixture prolongs the time to reach an equilibrium yield. For example, with 3% water added to the oil feedstock, the time to reach an equilibrium yield is prolonged from 60 minutes to 90 minutes. Further increases in the amount of water lead to additional increases in the reaction time necessary to reach equilibrium. When equilibrium is finally achieved, the overall yield of FAME is around 97% regardless of the water content.

Figure 10D:
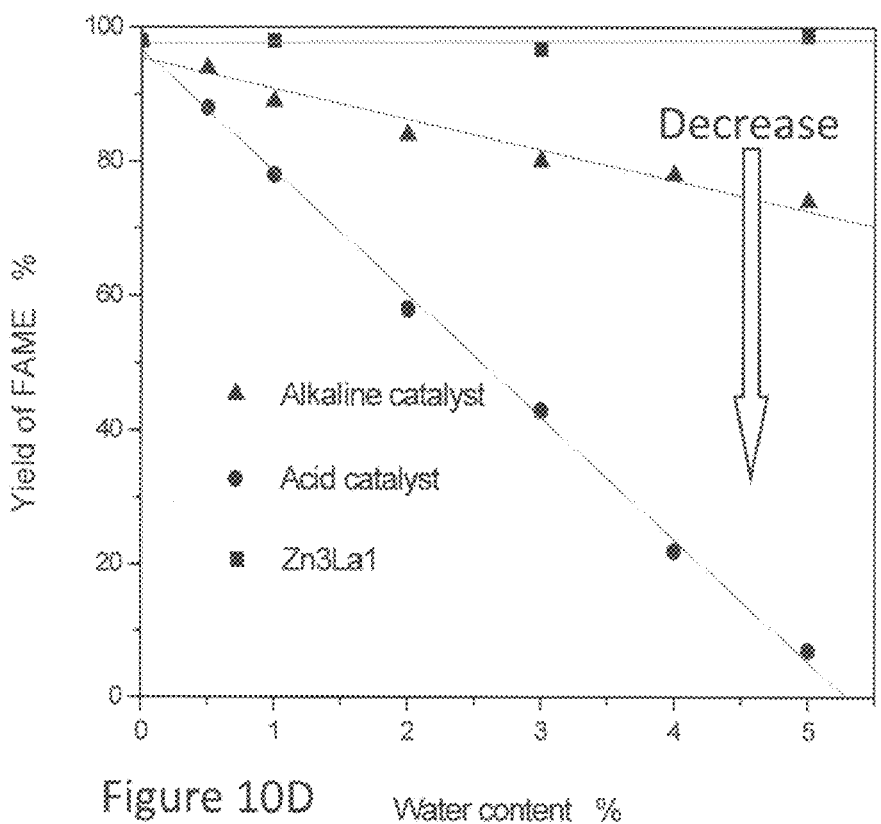
FIG. 10D is a graphical representation of the effect of FFA content on the equilibrium yield of FAME in the presence of an alkaline catalyst, an acid catalyst, or a Zn3La1 catalyst.

Referring now to FIG. 10D, when conventional $H_2SO_4$ or NaOH catalysts are used, the addition of water shows a considerable effect on transesterification activity. When water addition in oils was 5%, FAME yields decreased to 78% and 11% when using the NaOH and $H_2SO_4$ catalyst, respectively. In comparison, the yield of FAME in the Zn3La1 catalyzed system is maintained at about 97% with the addition of 5% water to the reaction mixture.

Figure 11:
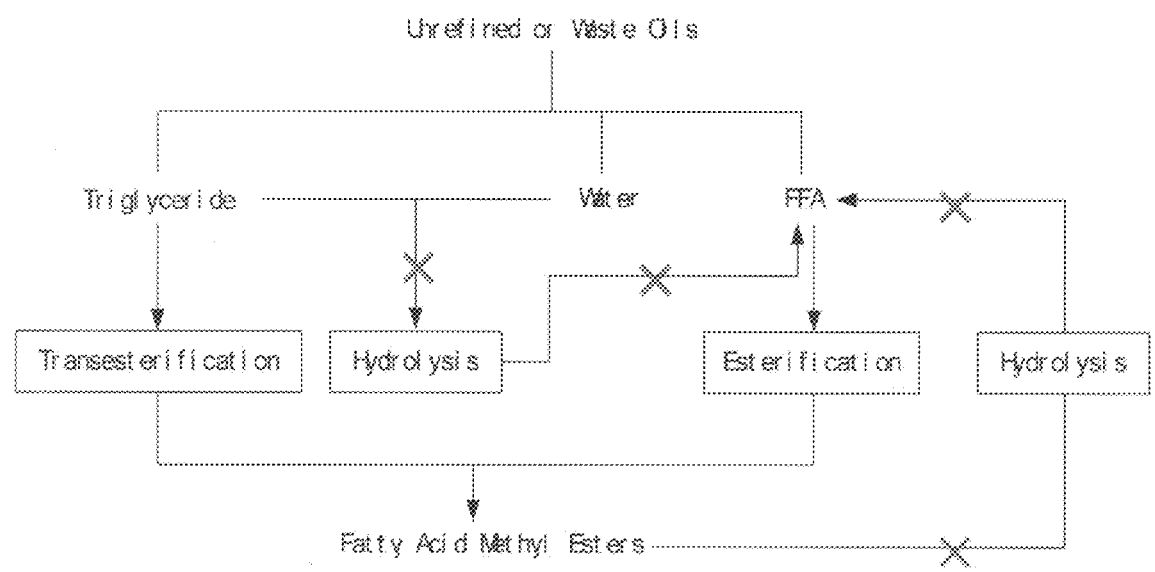
FIG. 11 is a schematic representation of the various reactions that may occur when using unrefined or waste oils as feedstock.

A novel catalyst system comprising zinc and lanthanum oxides, with a Zn3La1 catalyst system being preferred, can actively catalyze the oil transesterification reaction when the temperature is over about 170° C., can actively catalyze FFA esterification when the temperature is over about 140° C., and can actively catalyze biodiesel and oil hydrolysis when the reaction temperature exceeds about 220° C. Thus, in order to obtain a high FAME yield, the reaction temperature is preferably maintained within the range of about 170 to 220° C. in order to enhance the simultaneous transesterification and esterification reactions, while limiting the occurrence of any hydrolysis reactions. In FIG. 11, the possible reaction pathways that are enhanced and inhibited by the catalyst system of the present disclosure during the changing of unrefined and waste oils into biodiesel within the above described temperature range are shown. Biodiesel is formed through triglyceride transesterification and FFA esterification reactions and may be consumed through the occurrence of a FAME hydrolysis reaction. The occurrence of triglyceride hydrolysis will consume the raw material and increase the total acid number of the reactants, which can be harmful to reaction equipment. Under the reaction conditions of the present disclosure, the occurrence of FAME hydrolysis and triglyceride hydrolysis reactions are reduced or limited.

The reaction mechanism for the esterification reaction between the fatty acid and alcohol (e.g., methyl alcohol) is believed to include the interaction of the carbonyl oxygen of the fatty acids with the Lewis acidic site (L*) of the catalyst to form a carbocation. The nucleophilic attack of the alcohol on the carbocation produces an intermediate, which eliminates a water molecule to form a methyl ester. The reaction mechanism for the transesterification reaction between adsorbed methanol and triglyceride is believed to include the adsorption of the alcohol at the Lewis base site (B−) of the catalyst to form an oxygen anion. The nucleophilic attack of alcohol on the esters produces an intermediate from which a hydroxyl group is cleaved forming two esters. The presence of excess alcohol favors the occurrence of each reaction, thereby, maximizing the yield of FAME. One skilled-in-the-art will understand that other mechanisms for the esterification and transesterification reactions are also feasible.

Figure 12:
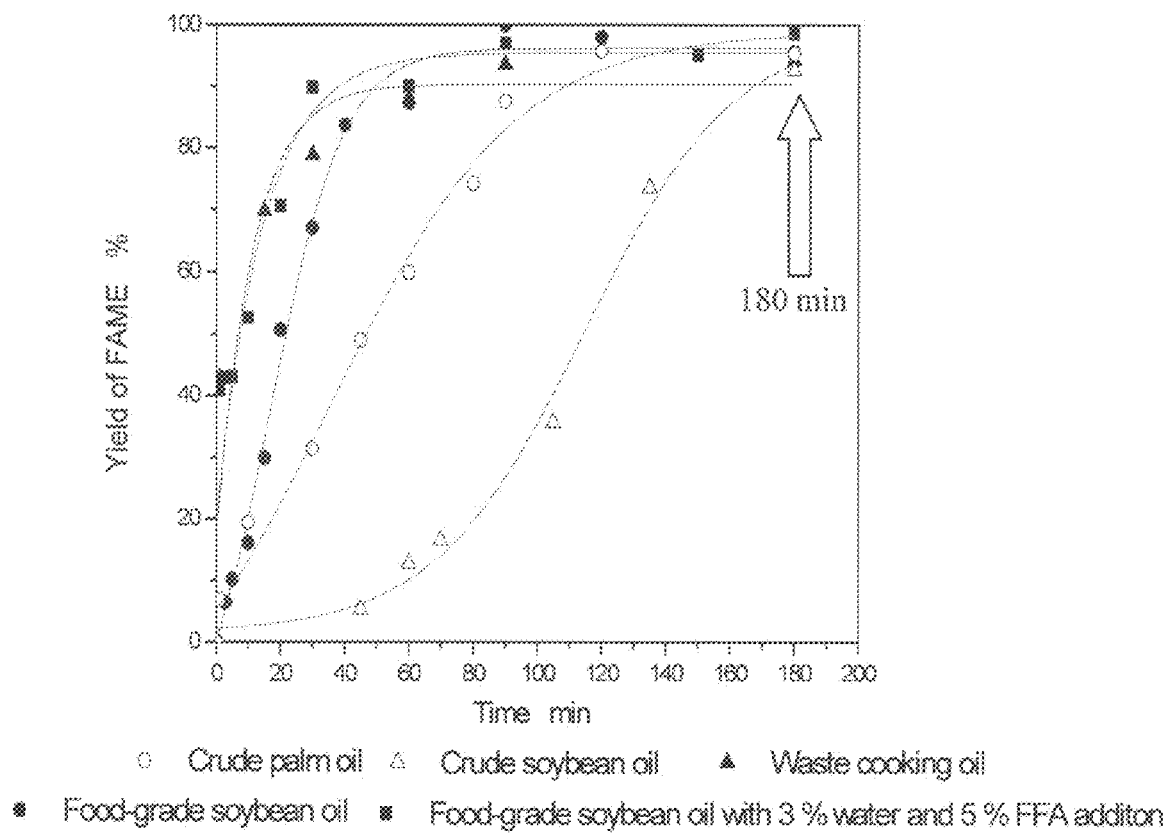
FIG. 12 is a graphical representation of the yield of FAME obtained from a transesterification reaction using various oil feedstocks in the presence of a Zn3La1 catalyst plotted as a function of time.

Several unrefined and waste oils without any pretreatment were converted directly using the Zn3La1 catalyst at 200° C. as summarized in FIG. 12. FIG. 12 illustrates the yield of biodiesel obtained using waste cooking oil, unrefined soybean oil, unrefined palm oil, food-grade soybean oil with 5% oleic acid and 3% water, and food-grade soybean oil as the oil feedstock in the transesterification and esterification reactions catalyzed according to the teachings of the present disclosure. The FFA and water contents of these oils are shown in Table 1. It is remarkable that the equilibrium yield of the different oils were all very high at about 96%. For the Zn3La1 catalyst system, the presence of FFA and water did not significantly affect the equilibrium yield.

It is another objective of the present invention to provide a method of forming a biodiesel product from unrefined or waste oils. The method comprises the steps of preparing a heterogeneous catalyst system that comprises a mixture of zinc and lanthanum oxides; placing an unrefined oil feedstock and an alcohol in contact with the catalyst system to form a reaction mixture, heating the reaction mixture to a temperature that is between about 170° C. and 220° C.; allowing the transesterification of triglycerides in the oil feedstock and the esterification of the fatty free acids in the oil feedstock to simultaneously occur for a predetermined amount of time to form fatty acid methyl esters resulting in a biodiesel product; and finally separating the catalyst from the biodiesel product in order to collect the biodiesel product. The reaction mixture may include free fatty acids in a concentration that is greater than about 0.5 wt. % and water in a concentration that is greater than about 1 wt. %, without having any detrimental effect on catalyst activity.

The step in the method involving the preparation of a heterogeneous catalyst system may include combining together in a predetermined ratio, a first solution of Zn(NO3)2, a second solution of La(NO3)2, and a third solution of urea, to form a mixed solution; separating and collecting any precipitated solids from the liquid present in the mixed solution; drying the collected solids for a predetermined amount of time; and calcining the solids at a temperature of about 450° C.

The heterogeneous catalyst system used may be a mixture of zinc and lanthanum oxides that include a combination of ZnO, La2CO5, and LaOOH. This combination of oxides may have a Zn:La bulk molar ratio between about 1.0:0 and 0:1.0. This combination of oxides may also have a surface area between about 12.2 and 16.8 m$^2$/g and a surface composition comprising between about 4.2-26.8% $Zn^{2+}$, about 2.1-7.9% $La^{3+}$, and about 19.9-37.5% $O_{lat}$, as well as surface atom ratio of $Zn^{2+}$:$La^{3+}$ between about 1.4:1.0 and 11.6:1.0, and a surface atom ratio of $(Zn^{2+}+La^{3+})$:$O_{lat}$ between about 0.2:1.0 and 1.1:1.0. Preferably, this combination of oxides will have a Zn:La bulk molar ratio of about 3.5:1.0, a surface area of about 15.7 m$^2$/g, a surface composition comprising about 26.8% $Zn^{2+}$, about 2.8% $La^{3+}$, and about 30.5% $O_{lat}$, a surface atom ratio for $Zn^{2+}$:$La^{3+}$ of about 9.6:1.0, and a surface atom ratio for $(Zn^{2+}+La^{3+})$:$O_{lat}$ of about 1.0:1.0.

The unrefined oil feedstock that is placed in contact with the catalyst system to form a reaction mixture may include an oil with a free fatty acid concentration that is greater than about 4 wt. % and/or a water concentration that is greater than about 3 wt. %. The ratio of alcohol to oil used to form the reaction mixture may be in a molar ratio that is greater than about 28:1 with greater than about 36:1 being especially preferred. The alcohol is preferably methyl alcohol. The unrefined oil feedstock may be selected as one from the group of waste cooking oil, unrefined soybean oil, unrefined palm oil, food-grade soybean oil, and combinations or mixtures thereof.

The following specific examples are given to illustrate the invention and should not be construed to limit the scope of the invention.

Example 1

Feedstock Selection and Analysis

Food-grade soybean oil was purchased from Costco warehouse (Detroit, Mich.), crude soybean oil was from BDI (Denton, Tex.), crude palm oil was from Malaysia (Selangor) and waste cooking oil was obtained from various restaurants. These four types of oils were analyzed using conventional methodology for their fatty acid composition. The fatty acid composition for the oils as identified in this analysis is provided in Table 3.

Oleic acid and methyl alcohol were obtained from Mallinckrodt Chemicals (Phillipsburg, N.J.), with water content on the order of about 0.0297% and about 0.0332%, respectively. Zinc nitrate hexahydrate (98%), lanthanum nitrate hydrate (98%), and urea (99%) were obtained as analysis grade from the Sigma-Aldrich Company (Louis, Mo.).

TABLE 3

| Fatty Acid Components | Food-grade Soybean Oil (%) | Crude Soybean Oil (%) | Crude Palm Oil (%) | Waste Cooking Oil (%) |
|---|---|---|---|---|
| C 14:0 | 0 | 0.27 | 0.21 | 0 |
| C 16:0 | 10.97 | 13.09 | 41.92 | 11.58 |
| C 16:1 | 0.09 | 0.39 | 0.23 | 0.18 |
| C 18:0 | 3.59 | 4.18 | 3.85 | 4.26 |
| C 18:1 | 20.07 | 22.81 | 42.44 | 24.84 |
| C 18:2 | 57.07 | 52.93 | 11.3 | 53.56 |
| C 18:3 | 7.29 | 6.61 | 0.04 | 5.6 |
| FFA Content | 0.02 | 3.31 | 0.24 | 3.78 |
| Water Content | 0.02 | 0.27 | 0.04 | 0.06 |

This example describes and characterizes the materials used to form the oil feedstock, the alcohol reactant, and the catalysts that are used throughout this disclosure and in the following examples.

Example 2

Catalyst Preparation and Characterization

The catalysts were prepared using a homogeneous co-precipitation method. First, 2 Molar $Zn(NO_3)_2$ and 1 Molar $La(NO_3)_3$ solutions were prepared with distilled water. Then five solutions were prepared by mixing the zinc nitrate and lanthanum nitrate solutions so that each resulting solution comprised a different Zn:La ratio, namely, 1:0, 1:1, 3:1, 9:1, and 0:1. Each of these five solutions was then mixed with a 2 Molar urea solution. Each mixture was boiled for 4 hours, and then dried at 150° C. for 8 hours. Finally, each "dried" mixture was exposed to step-rising calcination at 250° C., 300° C., 350° C., 400° C., and finally at 450° C. for 8 hours. The catalysts were labeled according to their catalyst composition as Zn10La0, Zn1La1, Zn3La1, Zn9La1, or Zn0La10.

A powder X-ray diffraction (XRD) pattern was obtained for each calcined catalyst using a Rigaku RU2000 rotating anode powder diffractometer equipped with CuKα radiation (40 kV, 200 mA). The bulk composition of the catalyst was measured by energy dispersive spectrometry (EDS) using a Scanning Electron Microscope (Hitachi S-2400) with a maximum operating voltage of 25 kV. Finally, XPS analysis of the calcined catalysts was performed using a PHI 5500 system (Perkin Elmer, Wellesley, Mass.), having a monochromatic aluminum Kα X-ray radiation source (1486.6 eV) and an AugerScan system control (RBD Enterprises, Bend, Oreg.). The elemental composition on the surface of each catalyst was measured using XPS multiplex scan with a spot size on the order of about 1 millimeter in diameter.

This example describes the methodology used to characterize the structure and activity of the zinc and lanthanum mixed oxide catalysts that are used throughout this disclosure and in the following examples.

Example 3

Biodiesel Reactions and Product Analysis

All catalytic transesterification, esterification, and hydrolysis reactions were conducted in a 500 mL stainless stirred reactor (Parr 4575 HT/HP Reactor). The transesterification reactions were conducted using 126 grams of oil, 180 grams of methanol, and 3 grams of a catalyst. During the reaction, 15 mL of the reaction mixture was collected via a two-stage liquid sampler at various time intervals. When the reaction was completed, the catalyst and liquid product were separated by filtration. The liquid product obtained was vaporized to remove any excessive methanol, and then placed into a separating funnel and allowed to settle or separate into layers. The upper layer in the separating funnel (mainly containing the fatty acid methyl esters) was characterized using a GC-MS spectrometer (Clarus 500 MS System, PerkinElmer, Shelton, Conn.) equipped with a capillary column (Rtx-WAX Cat. No. 12426) (Bellefonte, Pa.). Methyl arachidate (Nu-Chek Prep Inc, Elysian, Minn.) was used as an internal standard for this characterization.

The esterification reactions were performed using 126 grams of oleic acid, 180 grams of methanol, and 3 grams of Zn3La1 catalyst. The yield of oleic acid methyl ester from each reaction was determined using GC-MS. The content of oleic acid from each reaction was further examined using a Brinkman/Metrohm 809 titrando (Westbury, N.Y.) according to ASTM D 664.

The hydrolysis reactions for the oil and biodiesel were conducted using 295 grams of food-grade soybean oil or soybean biodiesel (Wacker Oil, Manchester, Mich.), 15 grams of water and 2.3 wt. % of Zn3La1 catalyst. The yield of FFA was determined using a Brinkman/Metrohm 809 titrando (Westbury, N.Y.) according to ASTM D 664. The water content of each sample was then analyzed using a Brinkman/Metrohm 831 KF Coulometer (Westbury, N.Y.) according to ASTM D 6304-00.

This example demonstrates the basic methodology used to conduct the various transesterification and esterification reactions described throughout this disclosure.

A person skilled in the art will recognize that all of the measurements described are standard measurements that can be obtained by a variety of different test methods. The test methods described in the examples and the throughout the specification represent only one available method capable of obtaining each of the desired measurements.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method comprising the steps of:
   providing a heterogeneous catalyst system, the catalyst system comprising a mixture of ZnO, $La_2CO_5$, and LaOOH;
   placing a feedstock and an alcohol in contact with the catalyst system to form a reaction mixture, the feedstock including triglycerides, free fatty acids in a concentration that is greater than about 0.5 wt. %, and water in a concentration that is greater than about 1 wt. %;
   heating the reaction mixture; and
   allowing the catalyzed transesterification of the triglycerides and the catalyzed esterification of the free fatty acids to simultaneously occur for a predetermined amount of time to form the respective corresponding alcoholic esters of the triglycerides and the free fatty acids.

2. A method of preparing a heterogeneous catalyst system, comprising:
   mixing a first solution of a Zn salt, a second solution of a La salt, and a third solution of urea, to form a mixed solution;
   separating and collecting any precipitated solids from the liquid present in the mixed solution;
   drying the collected solids for a predetermined amount of time; and
   calcining the solids to provide the heterogeneous catalyst system.

3. The method of claim 1, wherein the heterogeneous catalyst system comprising a mixture of zinc and lanthanum oxides includes a combination of oxides having a Zn:La bulk molar ratio between about 1.0:0 and 0:1.0.

4. The method of claim 1, wherein the heterogeneous catalyst system comprising a mixture of zinc and lanthanum oxides includes a combination of oxides having a surface area between about 12.2 and 16.8 $m^2/g$ and a surface composition comprising between about 4.2-26.8% $Zn^{2+}$, about 2.1-7.9% $La^{3+}$, and about 19.9-37.5% $O_{lat}$.

5. The method of claim 4, wherein the heterogeneous catalyst system comprising a mixture of zinc and lanthanum oxides includes a combination of oxides having a surface atom ratio for $Zn^{2+}$:$La^{3+}$ between about 1.4:1.0 and 11.6:1.0, and a surface atom ratio for ($Zn^{2+}$+$La^{3+}$):$O_{lat}$ between about 0.2:1.0 and 1.1:1.0.

6. The method of claim 1, wherein the heterogeneous catalyst system comprising a mixture of zinc and lanthanum oxides includes a combination of oxides having a Zn:La bulk molar ratio of about 3.5:1:0 and a surface area of about 15.7 $m^2/g$.

7. The method of claim 6, wherein the heterogeneous catalyst system comprising a mixture of zinc and lanthanum oxides includes a combination of oxides having a surface composition comprising about 26.8% $Zn^{2+}$, about 2.8% $La^{3+}$, and about 30.5% $O_{lat}$, a surface atom ratio for $Zn^{2+}$:$La^{3+}$ of about 9.6:1.0, and a surface atom ratio for ($Zn^{2+}$+$La^{3+}$):$O_{lat}$ of about 1.0:1.0.

8. The method of claim 1, wherein the feedstock has a free fatty acid concentration that is greater than about 4 wt. %.

9. The method of claim 1, wherein the feedstock has a water concentration that is greater than about 3 wt. %.

10. The method of claim 1, wherein the step of allowing the transesterification reaction to proceed to form the fatty acid methyl esters includes a predetermined amount of time that is greater than about 30 minutes.

11. The method of claim 1, wherein the step of allowing the transesterification reaction to proceed to form the fatty acid methyl esters produces greater than about a 70% yield of the fatty acid methyl esters in less than about 100 minutes.

12. The method of claim 1, wherein in the placing step, the alcohol to feedstock molar ratio is greater than about 28.

13. The method of claim 12, wherein the alcohol to feedstock molar ratio is greater than about 36.

14. The method of claim 1, wherein the feedstock is an unrefined oil feedstock selected as one from the group of waste cooking oil, unrefined soybean oil, unrefined palm oil, food-grade soybean oil, and combinations or mixtures thereof.

15. A heterogeneous catalyst system comprising:
zinc oxide having a mean grain size between about 9.8 and 27.6 nanometers; and
a mixture of $La_2CO_5$ and LaOOH,
the combination of zinc and lanthanum oxides having a Zn:La bulk molar ratio between about 1.2:1:0 and 8.9:1.0; a surface area between about 14.9 and 16.8 $m^2$/g, a surface composition comprising between about 4.2-26.8% $Zn^{2+}$, about 2.1-2.9% $La^{3+}$, and about 23.2-32.9% $O_{lat}$, a surface atom ratio for $Zn^{2+}$:$La^{3+}$ between about 1.4:1.0 and 11.6:1.0, and a surface atom ratio for $(Zn^{2+}+La^{3+})$:$O_{lat}$ between about 0.2:1.0 and 1.1:1.0.

16. The catalyst system of claim 15, wherein the combination of zinc and lanthanum oxides has a Zn:La bulk molar ratio of about 3.5:1:0; a surface area of about 15.7 $m^2$/g, a surface composition comprising about 26.8% $Zn^{2+}$, about 2.8% $La^{3+}$, and about 30.5% $O_{lat}$, a surface atom ratio for $Zn^{2+}$:$La^{3+}$ of about 9.6:1.0, and a surface atom ratio for $(Zn^{2+}+La^{3+})$:$O_{lat}$ of about 1.0:1.0.

17. The catalyst system of claim 15, wherein the combination of zinc and lanthanum oxides is one selected from the group of Zn10La0, Zn1La1, Zn3La1, Zn9La1, and Zn0La10.

18. A method, comprising:
contacting a feedstock comprising a triglyceride and a free fatty acid with an alcohol in the presence of a heterogeneous catalyst, the catalyst comprising a mixture of ZnO, $La_2CO_5$, and LaOOH,
wherein both the catalyzed transesterification of the triglyceride and the catalyzed esterification of the free fatty acid occur to form the respective corresponding alcoholic esters of the triglyceride and the free fatty acid.

19. A heterogeneous catalyst system prepared by a process comprising:
mixing a first solution of a Zn salt, a second solution of a La salt, and a third solution of urea, to form a mixed solution;
separating and collecting any precipitated solids from the liquid present in the mixed solution;
drying the collected solids for a predetermined amount of time; and
calcining the solids to provide the heterogeneous catalyst system.

* * * * *